United States Patent Office 3,102,150
Patented Aug. 27, 1963

3,102,150
PROCESS FOR HYDROGENATING CARBONYL COMPOUNDS
Edward Allen Hunter and Clyde Lee Aldridge, Baton Rouge, La., assignors to Esso Research and Engineering Company, a corporation of Delaware
No Drawing. Filed Feb. 19, 1960, Ser. No. 9,682
7 Claims. (Cl. 260—632)

This invention relates to the production of alcohols substantially free of acetals. More particularly it relates to a hydrogenation treatment whereby aldehydes and acetals are reduced substantially quantitatively to alcohols. Still more particularly it relates to the use of acidic ion exchange resin during the catalytic hydrogenation of aldehydes or acetals, whereby undesirable acetal formation is avoided and pre-existent acetals are reduced to alcohols.

It is well known that when an aldehyde is catalytically hdrogenated to an alcohol, any alcohol present will tend to form an acetal by reaction with the unconverted aldehyde, thereby reducing the yield of the desired alcohol. In addition, such acetals dealcoholate rather readily and thereby form vinyl ethers. Since in many cases these ethers boil at about the same temperature as the desired alcohol, they constitute objectionable color forming impurities which are very difficult to remove from the product. In addition the acetals also tend to revert to their alcohol and aldehyde constituents, thereby introducing most undesirable carbonyl compounds into the product alcohol. Furthermore, where an extraneous light alcohol is present during the reduction of a relatively heavy aldehyde an acetal can be formed having a similar boiling point as the product alcohol and hence all but impossible to remove by distillation.

It is an object of the present invention to provide a process allowing a substantially quantitative conversion of aldehydes to alcohols without the formation of acetals.

Another object is to provide a process for eliminating acetal and aldehyde impurities from alcohols. Still other objects, as well as the manner of attaining them, will become apparent from the following description.

It has been previously reported by others that it is deleterious to add free hydrochloric, sulfuric or other acid to a system wherein an aldehyde is being catalytically hydrogenated since free acid tends to degrade the usual metallic hydrogenation catalysts. Indeed, in the case of hydrogenations employing Adams platinum catalyst it has been suggested to add a base to the system. Conversely, there are teachings in the art to the effect that the presence of acids promotes the formation of unsaturated ether aldehydes and acetals thereof when these are being prepared by reaction of unsaturated aydehydes and alcohols, e.g. acrolein and allyl alcohol.

It has now been surprisingly discovered that aldehydes can be hydrogenated essentially quantitatively to alcohols in the presence of alcohol over conventional hydrogenation catalysts, without interference by acetal formation, if the hydrogenation is carried out in the presence of a minor amount of a cation exchange resin in the acid or hydrogen form. Furthermore, preformed acetals may also be essentially quantitatively hydrogenated to the respective alcohols employing the hydrogen cation exchange resin in the presence of an amount of water at least equivalent to the acetal. This discovery is of importance in connection with several major industrial processes. For instance, in the manufacture of alcohols by the conventional oxo process or by the more recent aldox modification thereof (see U.S. 2,811,567), appreciable amounts of acetals are formed both in the olefin carbonylation stage and in the subsequent hydrogenation of the resulting aldehyde. Thus, for instance, when heptene is carbonylated, significant amounts of diisooctyl acetal of isooctyl aldehyde are formed both in the carbonylation or oxo stage and in the subsequent hydrogenation stage. Such acetals are usually rejected from the process in the form of heavy distillation bottoms when the product is distilled. In addition, since some methanol is also formed from the synthesis gas during the oxo reaction, dimethyl acetal of isooctylaldehyde is also formed which boils very close to the boiling range of the final isooctyl alcohol product and therefore tends to remain as a contaminant in the latter even upon redistillation. Similarly, when alcohols are made by the growth of ethylene on an aluminum alkyl compound followed by oxidation of the resulting growth product, some aldehyde as well as alcohol forms during the oxidation step. This aldehyde then contaminates the alcohol product either as such or by forming acetals therewith. In still another commercial process ethanol is made by the reduction of acetaldehyde, the latter being obtained by the hydration of acetylene. Finally, miscellaneous industrial operations involve the hydrofinishing of alcohols, especially ethanol, the main purpose of such hydrofinishing being the reduction of aldehyde impurities in the alcohol. No completely satisfactory process was known prior to the present invention for converting aldehydes such as oxo aldehydes or acetaldehyde quantitatively to the corresponding alcohols or for the complete removal of aldehydes or acetals from alcohols by hydrofinishing. For the purposes of convenience the term aldehydic compound, unless further qualified, will be used hereafter in a sense generic both to simple aldehydes and to acetals (i.e., condensation products of aldehydes and alcohols) as well as ether aldehydes. Reference is made, in this connection, to "Organic Chemistry," by Paul Karrer, Nordeman Publishing Company, New York, 1938, which at page 142 states that the acetals contain a protected aldehyde group, and can be substituted by halogens and can therefore be used for the synthesis of further aldehyde derivatives.

The present invention is applicable to the hydrogenation of aldehydic compounds selected from the group consisting of aldehydes and acetals, i.e. to simple aliphatic aldehydes having two or more carbon atoms and to acetals derived by reaction of an aldehyde of at least two carbon atoms with aliphatic alcohols having one or more carbon atoms. Examples of suitable simple aldehydes include acetaldehyde, n-butyraldehyde, isobutyraldehyde, octyl aldehyde (such as that produced by the oxo process or by the alkyl metal growth-oxidation process), 2-ethylhexaldehyde, dodecylaldehyde, hexadecyl aldehyde, eicosyl aldehyde, etc. Unsaturated aldehydes such as acrolein, crotonaldehyde, 2-ethylhexenal, etc. also can be reduced to saturated alcohol according to the present invention. Under milder conditions the relatively unstable unsaturated aldehydes can also be selectively reduced to the corresponding saturated aldehydes, with a minimum formation of alcohol, acetals and hydrocarbons. Hence, the simple aldehydes useful herein correspond to the empirical formula R—CHO wherein R is selected from the group consisting of straight and branched chain alkyl and alkenyl radicals of at least one carbon atom, e.g. 1 to 20 or more carbon atoms.

The invention is likewise applicable to the reduction of acetals or ether aldehydes formed by reaction of any one or more of the aforementioned simple aldehydes with methanol or any higher alcohols; e.g. the alcohols resulting from the reduction of any of the aforementioned aldehydes, or any mixture of alcohols. The simplest reaction involved in such acetal formation may be written as follows:

(IA)
$$R \cdot CHO + 2CH_3OH \rightleftharpoons R \cdot CH{\overset{OCH_3}{\underset{OCH_3}{\diagup}}} + H_2O$$

Or more broadly:

(IB)
$$R \cdot CHO + R'OH + R''OH \rightleftharpoons RCH{\overset{OR''}{\underset{OR'}{\diagup}}} + H_2O$$

In these reactions R is an alkyl or alkenyl radical of one or more carbon atoms and R' and R'' are the same or different alkyl radicals of one or more carbon atoms each. For instance, R' and R'' may be different when a higher aldehyde is hydrogenated using a lower alcohol such as ethanol as a solvent.

The formation of ether aldehydes may be represented by the following equation:

(II) $\quad R'OH + CH_2 = \underset{R}{C} \cdot CHO \rightleftharpoons R'OCH_2 \cdot \underset{R}{CH} \cdot CHO$ in which R' and R again have their respective hereinbefore given significance; i.e. the ether aldehydes are formed from saturated or primary alkyl type alcohols and alpha-methylene aliphatic aldehydes of up to about 20 carbon atoms each. For instance, ethanol and 2-methylprop-2-enal form a corresponding ether aldehyde of six carbon atoms; 2-ethylhexanol and 2-ethylhex-2-enal form an ether aldehyde of 16 carbon atoms, etc.

Of course, where acetals are to be treated, at least one mole of water should be present in the reaction per mole of acetal so as to permit reversion of the acetal to its aldehyde and alcohol components according to reaction (IB).

The cation exchange resins forming an essential element of the present invention are well known materials. They are solid, insoluble resins containing carboxylic or sulfonic acid groups, and are used substantially in their hydrogen form. They include sulfonated organic solids such as sulfonated coal, lignin, charcoal, cellulose or the like, and synthetic cation exchange resins such as sulfonated phenol-formaldehyde condensates, sulfonated polystyrene type resins, resins of the formaldehydetannin type, sulfated quebracho-formaldehyde condensates, etc. See, for example, U.S. Patents 2,089,444; 2,191,853; 2,104,501; 2,198,381; 2,340,110; 2,340,111; 2,366,007; 2,372,333; and 2,500,149 which variously show the preparation of suitable resins, their sulfonation, and final production of the ion exchange resin in its acid form. Since commercial resins are frequently sold in the form of sodium salts, such resins must be washed with dilute hydrochloric or other dilute mineral acid and free acid ions washed out with distilled water before use in order to convert the resins to the hydrogen or acid form.

The ion exchange resins should have a molecular weight high enough or a sufficiently cross-linked structure to be substantially insoluble in water and alcohols at the hydrogenation temperatures employed. Particularly suitable resins are those obtained by copolymerization of a vinyl aromatic compound such as styrene or vinyl toluene with a cross-linking agent such as divinylbenzene; i.e., 88 to 96% styrene and 12 to 4% divinylbenzene. They are desirably sulfonated so as to contain about 10 to 20% sulfur in the form of sulfonate groups, though resins with higher or lower degrees of sulfonation are also useful. Suitable ion-exchange resins of the sulfonated styrene-divinylbenzene copolymer type are available from the Dow Chemical Company under the "Dowex" brand. For instance, "Dowex 50X8" is a sulfonated copolymer of about 92% styrene and 8% divinylbenzene, sulfonated to contain, on a dry basis, about 40% of its weight in the form of sulfonic acid groups ($SO_3H$). Similar suitable ion exchange resins are available from the Rohm and Haas Company under the "Amberlite" trademark, "Amberlite IR-120" being a particularly satisfactory grade. In their commercial form they are usually present as a sodium salt and contain about 50% absorbed water based on the weight of anhydrous resin. Their particle size is usually between about 20 to 50 mesh.

The amount of ion exchange resin used in the process of this invention may range from about 0.01 to 20 parts, preferably 0.2 to 5 parts, per part of hydrogenation catalyst.

Lastly, the present invention requires the use of hydrogen and conventional hydrogenation catalyst under otherwise known conditions of temperature and pressure appropriate for the particular hydrogenation catalyst used. Highly active catalysts such as Adams platinum catalyst ($PtO_2$ activated by addition of a small amount of an iron salt such as ferrous chloride or sulfate to the reaction mixture) or Raney nickel are preferred because they can be used as relatively low temperatures, e.g. between 0° and 150° C., preferably between 15° and 50° C. Such low hydrogenation temperatures favor a long life of the ion exchange resin. However, other hydrogenation catalysts requiring more severe hydrogenation conditions are also operative. In the case of catalysts which are susceptible to carbon monoxide, e.g. nickel, it is desirable to use CO-free hydrogen, for instance, hydrogen which has been catalytically pretreated in a known manner so as to convert any carbon monoxide present therein to methane.

Catalyst systems useful herein, and hydrogenation temperatures and pressures appropriate thereto, include the following:

| Catalyst | Temp., ° C. | Pressure Atm. | Remarks |
|---|---|---|---|
| $PtO_2$ (Adams platinum). | 30-120 | 1-10 | Activated with about 4% $FeCl_3$ (or other soluble iron salt). |
| Raney Nickel | 15-100 | 1-10 | Requires methanized $H_2$. |
| Nickel on kieselguhr | 20-150 | 150-220 | Do. |
| Copper Chromite (Adkins). | 130-170 | 150-250 | May be supported. |
| Cobalt Molybdate on $Al_2O_3$. | 130-200 | 150-250 | Must be presulfided. |
| Molybdenum Sulfide on char. | 120-250 | 150-250 | Oxygen sensitive. |
| Pd on charcoal | 15-100 | 1-10 | |
| Pt on alumina | 100-150 | 50-150 | Regenerable by oxidation. |

The amount of hydrogenation catalyst used in this invention may be in the range between 0.01 and 20 parts per 100 parts of liquid feed for batch operation, as is otherwise well known in the art. For continuous operation over a catalyst bed, liquid feed rates may be in the range between 0.01 to 10 volumes of liquid per volume of catalyst per hour. Hydrogen is fed to the reaction at a rate between about 5 and 10,000 standard cubic feet, preferably 500 to 5,000 s.c.f., per barrel of liquid feed; the optimum amount obviously is dependent on the concentration of aldehydes or acetals in the feed to be reduced.

The invention may be carried out either in pressure bombs or continuously in appropriate pressure equipment. When operating in a continuous manner, the ion exchange resin and the hydrogenation catalyst are preferably mixed to give a substantially uniform mixture before charging them to the reactor. However, in batch runs the two solids may be charged separately to the bomb reactor without premixing.

The operation and effectiveness of the invention will now be further illustrated by the following examples.

In carrying out all the runs described below, Parr hydrogenation equipment was used comprising a glass reaction vessel carried in a mechanical shaker cradle and provided with an electrical heater. The vessel is connected with a hydrogen reservoir to provide a system of known volume. Catalyst, solvent, aldehyde, ferrous salt, and resin are charged to the reaction bottle without any special precautions. The system is flushed with hydrogen and then charged with hydrogen under known pressure. The shaker is started, bringing the hydrogen, catalyst, and aldehyde into contact, and reaction begins. The drop in hydrogen pressure in the system of known volume permits accurate calculation of the hydrogen which has reacted.

*Example I*

Run No. 1—Charge:
- 16.1 g. n-heptaldehyde (0.141 moles)
- 100 cc. 95% ethanol
- 0.5 cc. 0.2 molar $FeSO_4$
- 0.2 g. $PtO_2$ (Adams catalyst)
- Temperature—28–29° C.
- Total time—52 minutes
- Reactor free space—4.42 liters
- Initial pressure—50 p.s.i.g.
- Final pressure—39.5 p.s.i.g.
- Pressure drop—
  - Actual, 10.5 p.s.i.a.
  - Calculated, 11.7 p.s.i.a. (0.282 g. $H_2$) (for 100% conversion)
- 89.8% theoretical hydrogen absorption This result is in close agreement with numerous literature data on the hydrogenation of aldehydes in ethanol solution.

Run No. 2—Charge:
- 4.3 g. n-heptaldehyde (0.0376 moles)
- 100 cc. 95% ethanol
- 0.5 cc. 0.2 molar $FeSO_4$
- 2 cc. of thick aqueous slurry of ion exchange resin (Amberlite IR-120, sulfonated styrenedivinylbenzene copolymer)=1.2 grams dry resin
- 0.2 g. $PtO_2$
- Temperature—25–29° C.
- Total time—47 minutes
- Reactor free space—1.36 liters
- Initial pressure—55.4 p.s.i.g.
- Final pressure—45.8 p.s.i.g.
- Pressure drop—
  - Actual, 9.6 p.s.i.a.
  - Calculated 9.9 p.s.i.a. (0.0758 g. $H_2$) (for 100% conversion)
- 97% theoretical hydrogen absorption This result is quantitative within the accuracy of the equipment.

Comparison of runs 1 and 2 shows the outstanding improvement in hydrogenation obtained by addition of the acid (hydrogen-form) cation exchange resin.

Run No. 3—Charge:
- 100 cc. 95% ethanol
- 0.2 g. $PtO_2$
- 0.5 cc. 0.2 molar $FeSO_4$
- 2 cc. thick aqueous slurry of Amberlite IR-120 resin in acid form
- Temperature—26–45° C.
- Total time—1219 minutes
- Reactor free space—1.36 liters
- Initial pressure—55 p.s.i.g.
- Final pressure—55 p.s.i.g.
- Pressure drop—0

This run shows that the improvement in hydrogen take-up in run 2 over run 1 is not due to hydrogen absorption by the added resin.

*Example II*

In this example dimethyl acetal of n-heptaldehyde was subjected to hydrogenation. It was synthesized by reacting n-heptaldehyde in a conventional manner with methanol in the presence of an acid catalyst; the product was washed with 5% sodium hydroxide, dried over anhydrous calcium sulfate (Drierite), and the acetal was recovered by distillation.

Run No. 4—Charge:
- 4.1 g. dimethyl acetal of n-heptaldehyde (0.0256 moles)
- 100 cc. 95% ethanol
- 0.2 g. $PtO_2$
- 0.5 cc. 0.2 molar $FeSO_4$
- Temperature—25–45° C.
- Total time—1155 minutes
- Reactor free space—1.36 liters
- Initial pressure—40 p.s.i.g.
- Final pressure—37.8 p.s.i.g.
- Pressure drop—
  - Actual, 2.2 p.s.i.a.
  - Calculated, 6.8 p.s.i.a. (for 100% conversion)
- 32.4% theoretical hydrogen absorption Run No. 5—Charge:
- 4.1 g. dimethyl acetal of n-heptaldehyde (0.0256 moles)
- 100 cc. 95% ethanol
- 0.2 g. $PtO_2$
- 0.5 cc. 0.2 molar $FeSO_4$
- 2 cc. of thick aqueous slurry of Amberlite IR-120 resin in acid form
- Temperature—25–30° C.
- Total time—1287 minutes
- Reactor free space—1.36 liters
- Initial pressure—55 p.s.i.g.
- Final pressure—47.8 p.s.i.g.
- Pressure drop—
  - Actual, 7.2 p.s.i.a.
  - Calculated, 6.8 p.s.i.a. (for 100% conversion)
- 106% theoretical hydrogen absorption Comparison of runs 4 and 5 shows clearly that the addition of the acid resin makes possible the quantitative hydrogenation of acetals.

*Example III*

Run No. 6—Charge:
- 4.39 g. methyl hexyl formal (0.03 moles)
- 100 cc. 95% ethanol
- 0.2 g. $PtO_2$
- 0.5 cc. 0.2 molar $FESO_4$
- 2 cc. of a thick aqueous slurry of Amberlite IR-120 resin in the hydrogen form
- Temperature—25–46° C.
- Reactor free space—1.36 liters
- Total time—21.5 hours
- Initial pressure—55.1 p.s.i.g.
- Final pressure—52.8 p.s.i.g.
- Pressure drop—
  - Actual, 2.3 p.s.i.a.
  - Calculated, 7.95 p.s.i.a. (for 100% conversion)
- 29% theoretical hydrogen absorption This shows that while the invention is effective for the reduction of aldehydes and acetals (derived from aldehydes of two or more carbon atoms), it is not effective for the reduction of formals (derived from formaldehyde).

All proportions and percentages of materials are given on a weight basis throughout the specification, unless otherwise indicated.

The foregoing general description and examples will serve to indicate the nature, operation and advantages of the invention. It will be understood, however, that the invention is not limited thereby and that various modifications and variations not described herein are possible without departing from the scope of the present invention as defined in the appended claims. For instance, the invention is useful not only as a process for making pure alcohols from aldehyde-rich feeds but also for removing aldehydic impurities from liquids composed predominantly of alcohols.

The claimed invention is:

1. The process for hydrogenating an aldehydic compound selected from the group consisting of aldehydes of the formula R—CHO, R being a member of the group consisting of alkyl and alkenyl radicals of 1 to 20 carbon atoms and acetals of the formula

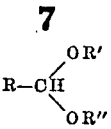

wherein R is a member of the group consisting of alkyl and alkenyl radicals of 1 to 20 carbon atoms and R' and R" are alkyl radicals of at least one carbon atom to the corresponding saturated alcohols which comprises contacting said aldehydic compounds with hydrogen in the presence of a hydrogenation catalyst and in the further presence of a cation exchange resin in its hydrogen form in amounts of about 0.01 to 20 parts of said resin per part of hydrogenation catalyst.

2. A process according to claim 1 wherein the aldehydic compound is an acetal and the reaction mixture also contains at least one mole of water per mole of acetal.

3. A process for converting an aldehyde of the formula R—CHO, R being an alkyl radical of 1 to 20 carbon atoms, to the corresponding alcohol by hydrogenation in the presence of an alcohol, which comprises maintaining said aldehyde in contact with hydrogen gas under pressure and at a hydrogenation temperature between 0° C. and 250° C. in the presence of (a) a hydrogenation catalyst sufficiently active to convert said aldehyde to alcohol at said hydrogenation temperature, and (b) about 0.01 to 20 parts of a solid sulfonated cation exchange resin in its hydrogen form per part of hydrogenation catalyst.

4. A process according to claim 3 wherein the ion exchange resin is a sulfonated cross-linked polystyrene resin containing about 10 to 20% sulfur in the form of sulfonic acid groups.

5. A process for converting an aldehyde of the formula R—CHO, R being an alkyl radical of 1 to 20 carbon atoms to the corresponding alcohol by hydrogenation in the presence of an alcohol, which comprises maintaining said aldehyde in contact with hydrogen gas under pressure and at a hydrogenation temperature between 15° C. and 50° C. in the presence of a hydrogenation catalyst consisting essentially of $PtO_2$ activated by a soluble ferrous salt which catalyst is present in an amount of 0.1 to 10 parts of $PtO_2$ per 100 parts of total liquid feed and sufficiently active to convert said aldehydes to alcohols at said temperatures and about 0.01 to 20 parts of a solid sulfonated cation exchange resin in its hydrogen form per part of hydrogenation catalyst which ion exchange resin is a sulfonated cross-linked polystyrene resin containing about 10 to 20% sulfur in the form of sulfonic acid groups.

6. A process for converting an aldehyde of the formula R—CHO, R being an alkyl radical of 1 to 20 carbon atoms to the corresponding alcohol by hydrogenation in the precence of an alcohol, which comprises maintaining said aldehyde in contact with hydrogen gas under pressure of about 1 to 220 atmospheres and at a hydrogenation temperature of about 20 to 100° C. in the presence of a nickel hydrogenation catalyst sufficiently active to convert said aldehyde to alcohol at the aforesaid temperatures and about 0.01 to 20 parts of a solid sulfonated cation exchange resin in its hydrogen form per part of hydrogenation catalyst, which ion exchange resin is a sulfonated cross-linked polystyrene resin containing about 10 to 20% sulfur in the form of sulfonic acid groups.

7. A process for converting an aldehyde of the formula R—CHO, R being an alkyl radical of 1 to 20 carbon atoms to the corresponding alcohol by hydrogenation in the presence of an alcohol which comprises maintaining said aldehyde in contact with hydrogen gas under pressure of about 150 to 250 p.s.i.g. and at a hydrogenation temperature of 120 to 250° C. in the presence of a molybdenum sulfide on char hydrogenation catalyst sufficiently active to convert said aldehyde to alcohol at the aforesaid temperature and about 0.01 to 20 parts of a solid, sulfonated cation exchange resin in its hydrogen form per part of hydrogenation catalyst.

References Cited in the file of this patent

UNITED STATES PATENTS

| | | |
|---|---|---|
| 2,628,986 | Wallace et al. | Feb. 17, 1953 |
| 2,839,569 | Kramer | June 17, 1958 |
| 2,879,307 | Bezard et al. | Mar. 24, 1959 |